US008341831B2

(12) United States Patent
Wang et al.

(10) Patent No.: US 8,341,831 B2

(45) Date of Patent: Jan. 1, 2013

(54) REMOVING TOOL AND METHOD USING SAME

(75) Inventors: Li-Juan Wang, Shenzhen (CN); Yong-Gang Zhang, Shenzhen (CN); Kuan-Hung Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 315 days.

(21) Appl. No.: 12/869,892

(22) Filed: Aug. 27, 2010

(65) Prior Publication Data

US 2012/0000048 A1 Jan. 5, 2012

(30) Foreign Application Priority Data

Jun. 30, 2010 (CN) .......................... 2010 1 0213985

(51) Int. Cl.
*B23P 19/00* (2006.01)

(52) U.S. Cl. .......................................................... 29/762

(58) Field of Classification Search ............... 29/402.01, 29/426.6, 426.5, 426.3, 426.1, 764, 762, 29/267, 270

See application file for complete search history.

(56) References Cited

U.S. PATENT DOCUMENTS 2,655,399 A * 10/1953 McMillan ....................... 294/17

* cited by examiner

*Primary Examiner* — John C Hong

(74) *Attorney, Agent, or Firm* — Altis Law Group, Inc.

(57) ABSTRACT

A removing tool used for removing a removable element from a shielding cover. The removing tool comprises a handle including a first end and a head protruding from the first end, a driving portion mounted on the head, and a pushing portion mounted on the head between the driving portion and the first end. The driving portion is for latching with the removable element; the pushing portion pushes the removable element away from the shielding cover until the removable element separates from the shielding cover.

8 Claims, 8 Drawing Sheets

REMOVING TOOL AND METHOD USING SAME

BACKGROUND

1. Technical Field

This disclosure relates to removing tools, particularly to removing tools used for removing a removable element from a shielding cover and methods using the removing tools.

2. Description of Related Art

A typical portable electronic device, such as a mobile phone, generally includes a printed circuit board with one or more electrical components and a shielding cover mounted to the printed circuit board for the electrical components. The shielding cover generally has a removable structure to allow exposure of the electrical components. However, typical removing tools can not always easily remove the removable structure from the shielding cover.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary removing tool and method using the removing tool. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
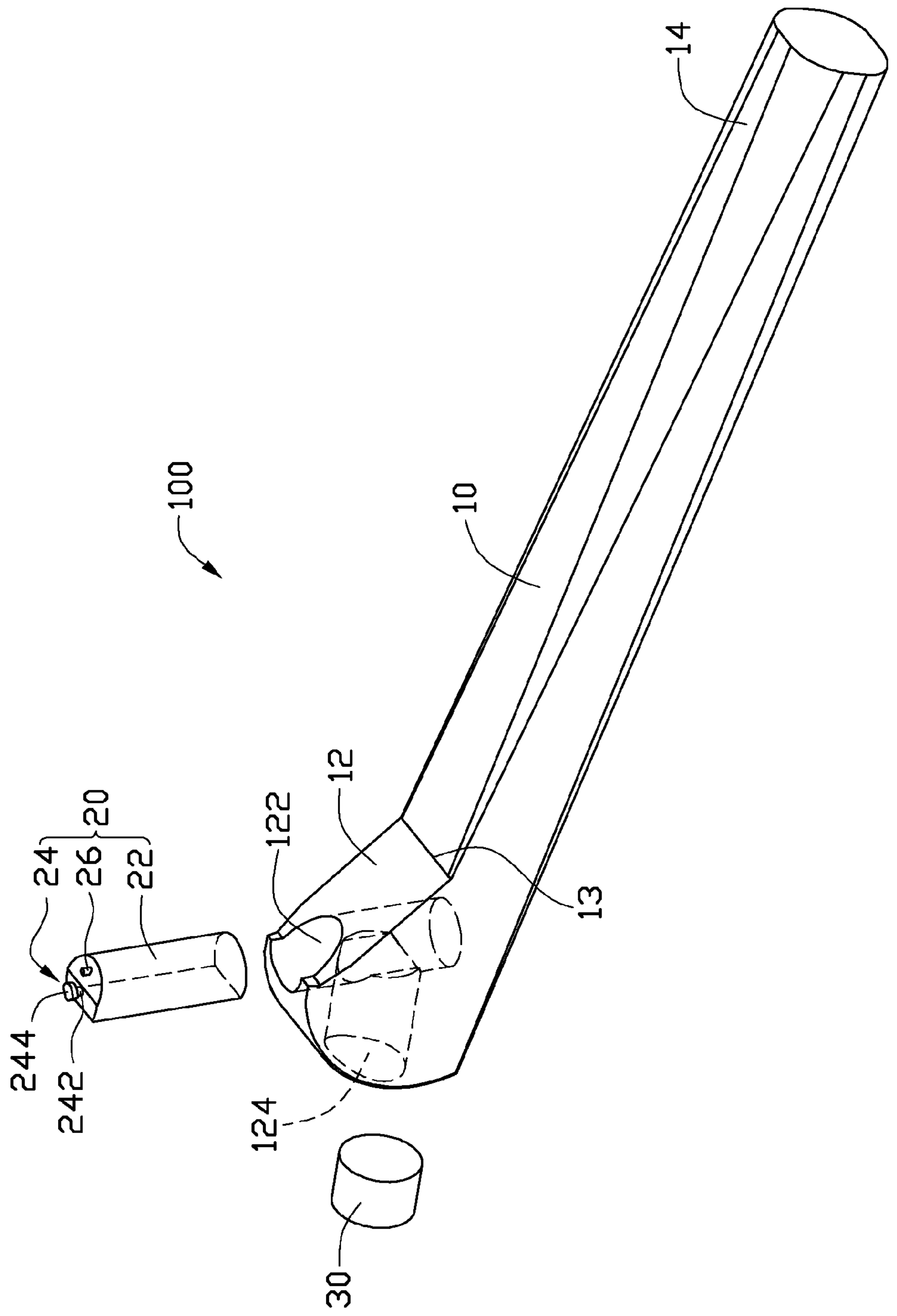
FIG. 1 is an exploded view of an exemplary embodiment of a removing tool.
Figure 2:
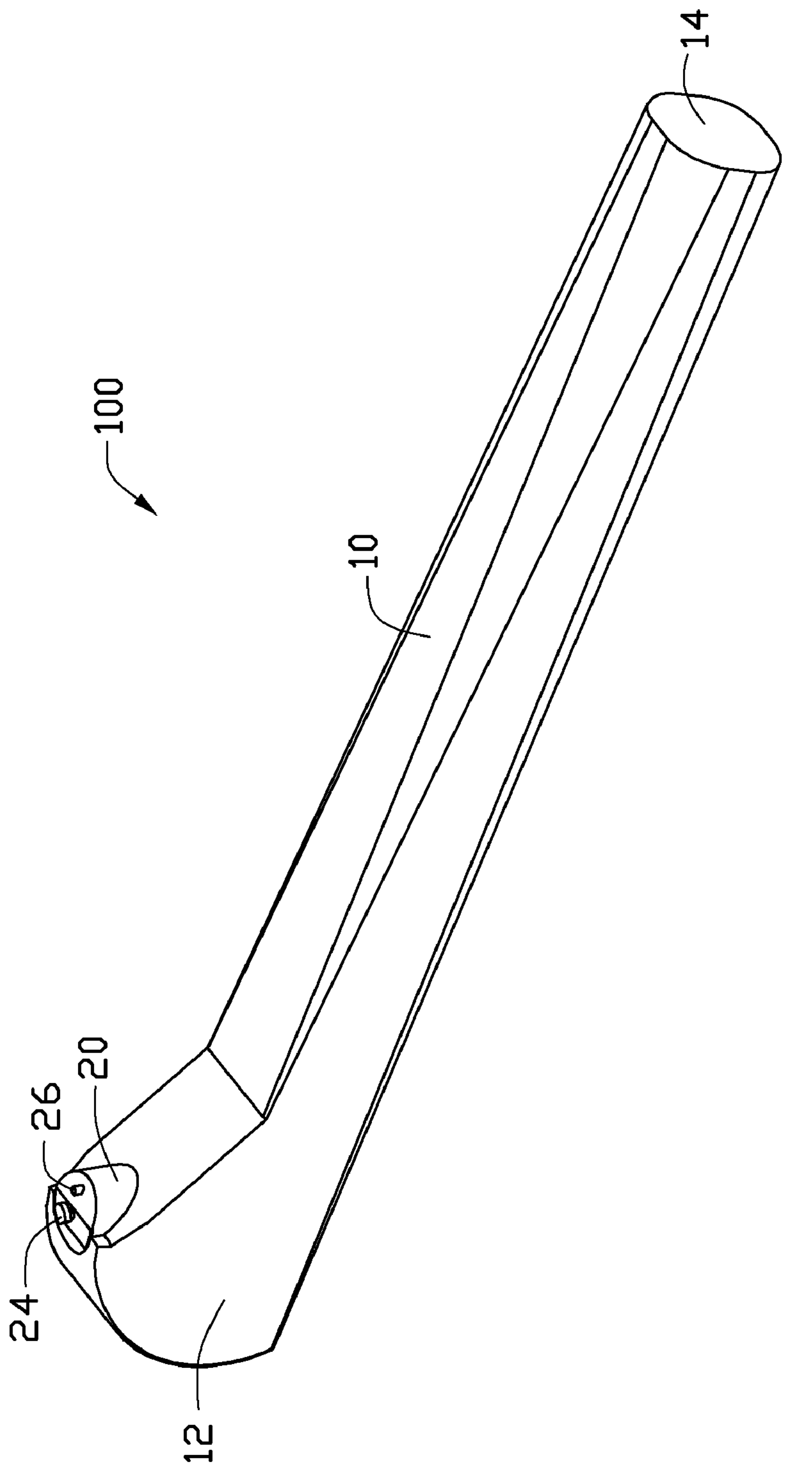
FIG. 2 is an assembled view of the removing tool shown in FIG. 1.
Figure 3:
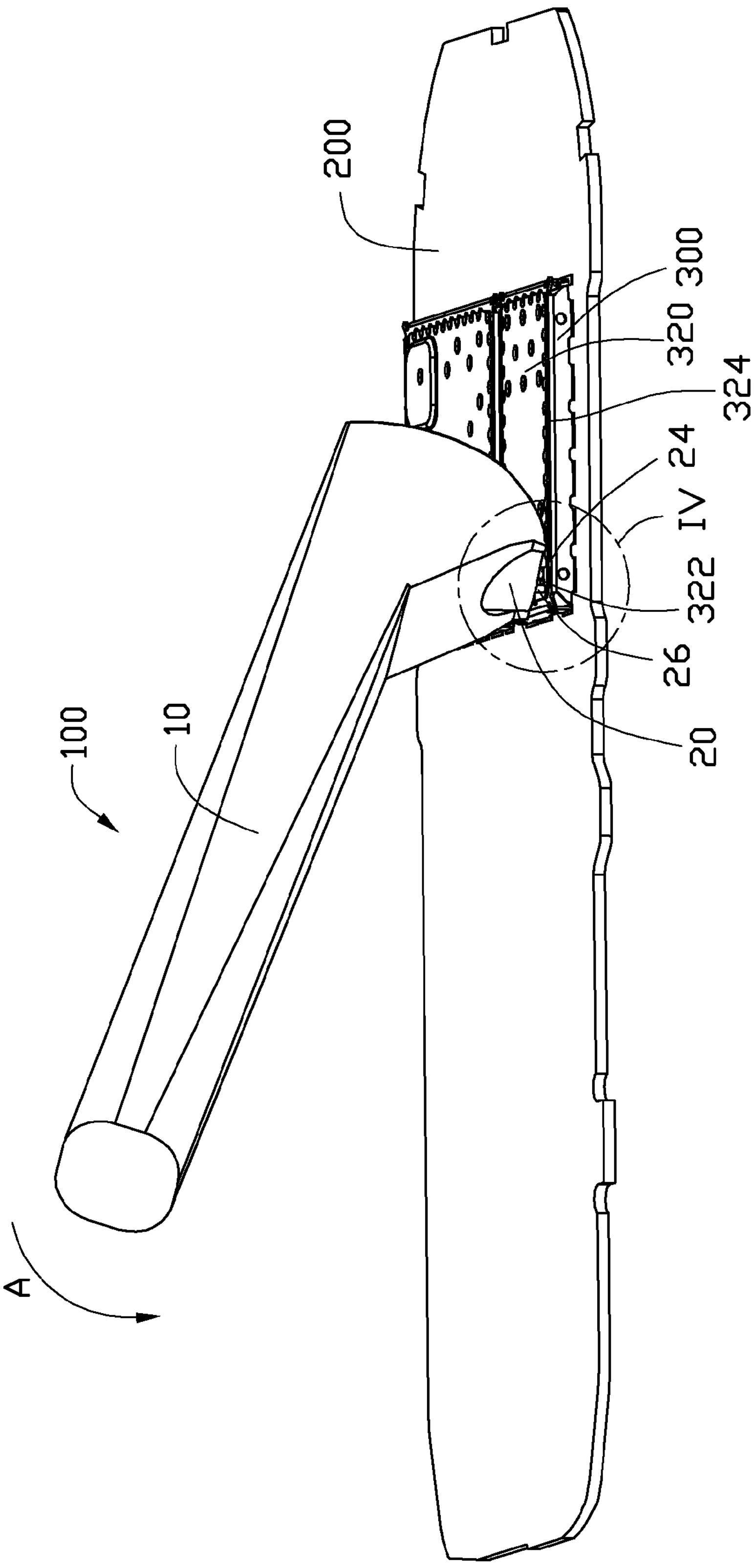
FIG. 3 is a schematic view of when the removing tool shown in FIG. 2 is used to remove a shielding cover on a printed circuit board in a first state.

Referring to FIGS. 1-3, a removing tool 100 is for removing a removable element 320 from a shielding cover 300. The removing tool 100 includes a handle 10 including a first end 13 and an opposite second end 14. The removing tool 100 further includes a head 12 formed on the first end 13 of the handle 10, a removing member 20 mounted in the head 12 and a retaining member 30 for assisting the removing member 20 to retain in the head 12. The head 12 defines a receptacle 122 for accommodating the removing member 20 and a hole 124 communicating with the receptacle 122. The retaining member 30 is retained in the hole 124 and applies resistance against the removing member 20 to keep the removing member 20 in place in the receptacle 122.

The removing member 20, in this exemplary embodiment, includes a main body 22, a driving portion 24 and a pushing portion 26. The main body 22 may be slightly larger than the receptacle 122 so the main body 22 can be retained in the receptacle 122 by the tight fitting engagement between the main body 22 and the receptacle 122. The driving portion 24 includes a connecting post 242 protruding from the main body 22 and a latching block 244 protruding from a distal end of the connecting post 242, and the latching block 244 is larger than the connecting post 242. The pushing portion 26 protrudes from the main body 22 and locates between the driving portion 24 and the first end 13 of the handle 10. The pushing portion 26 is used to separate the removable element 320 from the shielding cover 300.

The shielding cover 300 is mounted to a printed circuit board. The removable element 320 is retained on the shielding cover 300 and defines an opening 322. The opening 322 is for the driving portion 24 to pass through the removable element 320. The shielding cover 300 further defines a cracking slot 324 between the removable element 320 and the shielding cover 300. The cracking slot 324 facilitates the removable element 320 to separate from the shielding cover 300 along the cracking slot 324.

Figure 4:
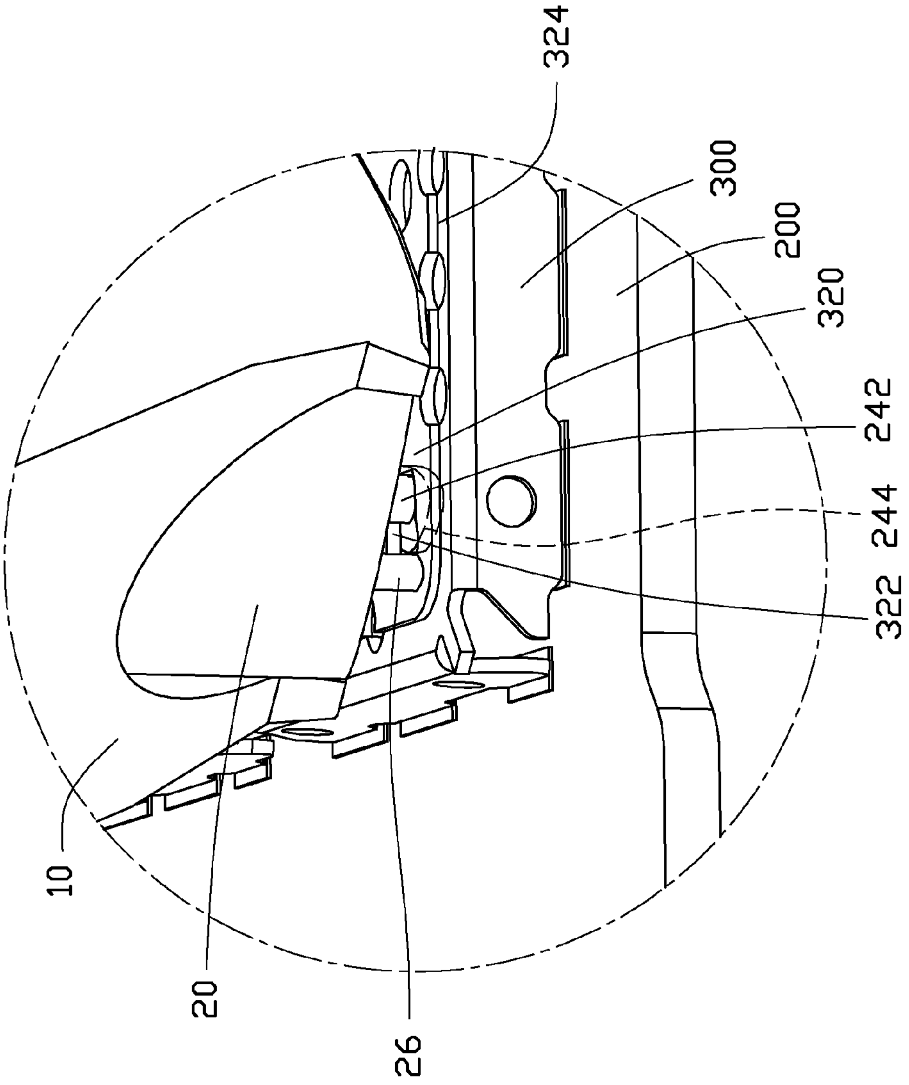
FIG. 4 is a partially enlarged view of a circled portion IV of FIG. 3.
Figure 5:
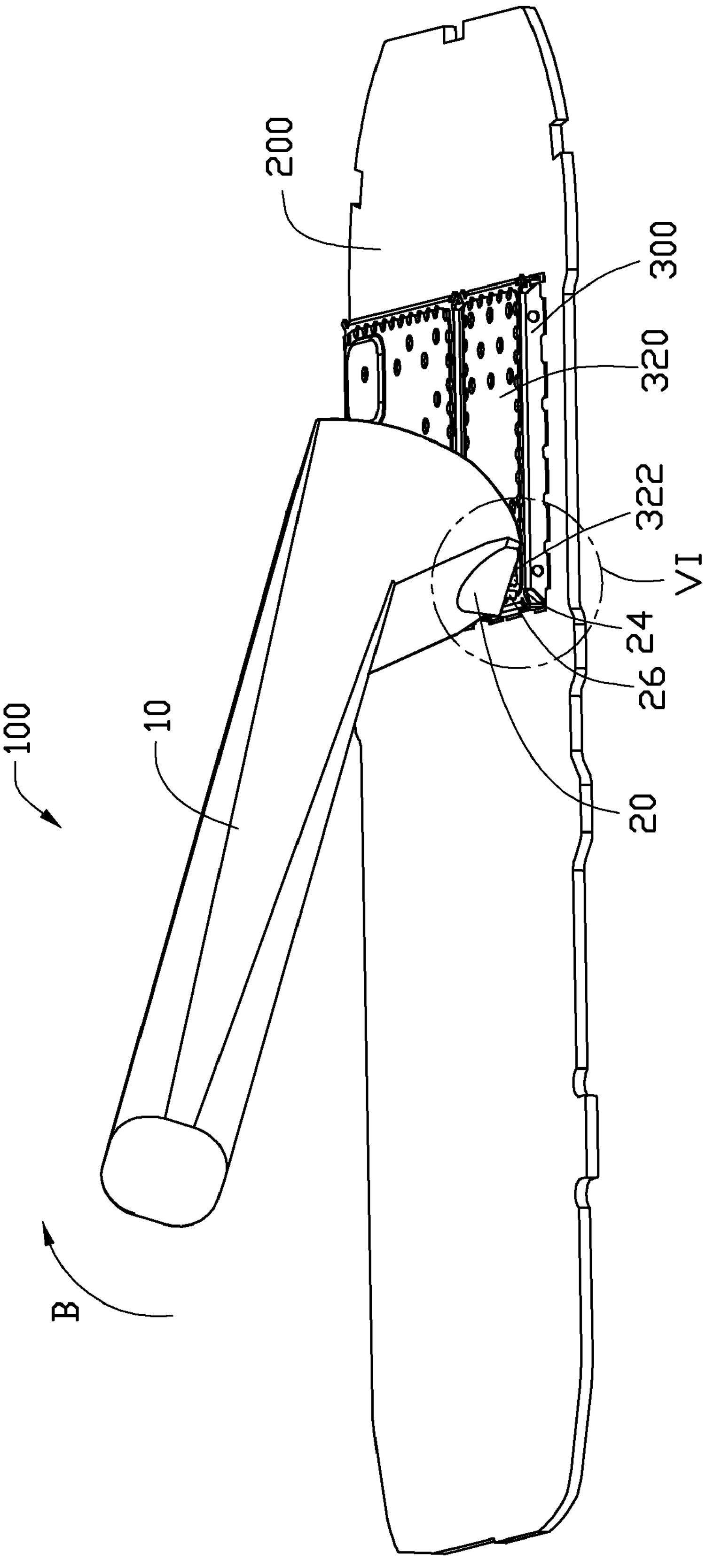
FIG. 5 is a schematic view of when the removing tool shown in FIG. 2 is used to remove the shielding cover on the printed circuit board in a second state.
Figure 6:
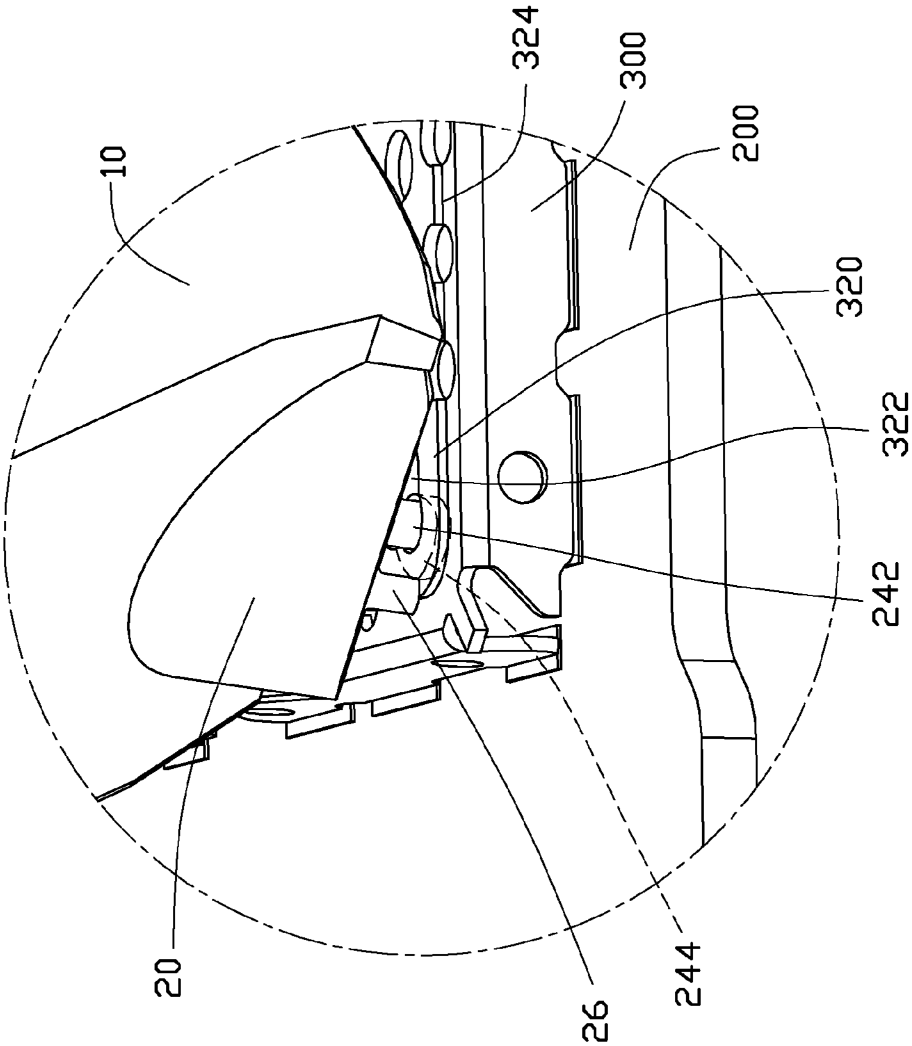
FIG. 6 is a partially enlarged view of a circled portion VI of FIG. 5.
Figure 7:
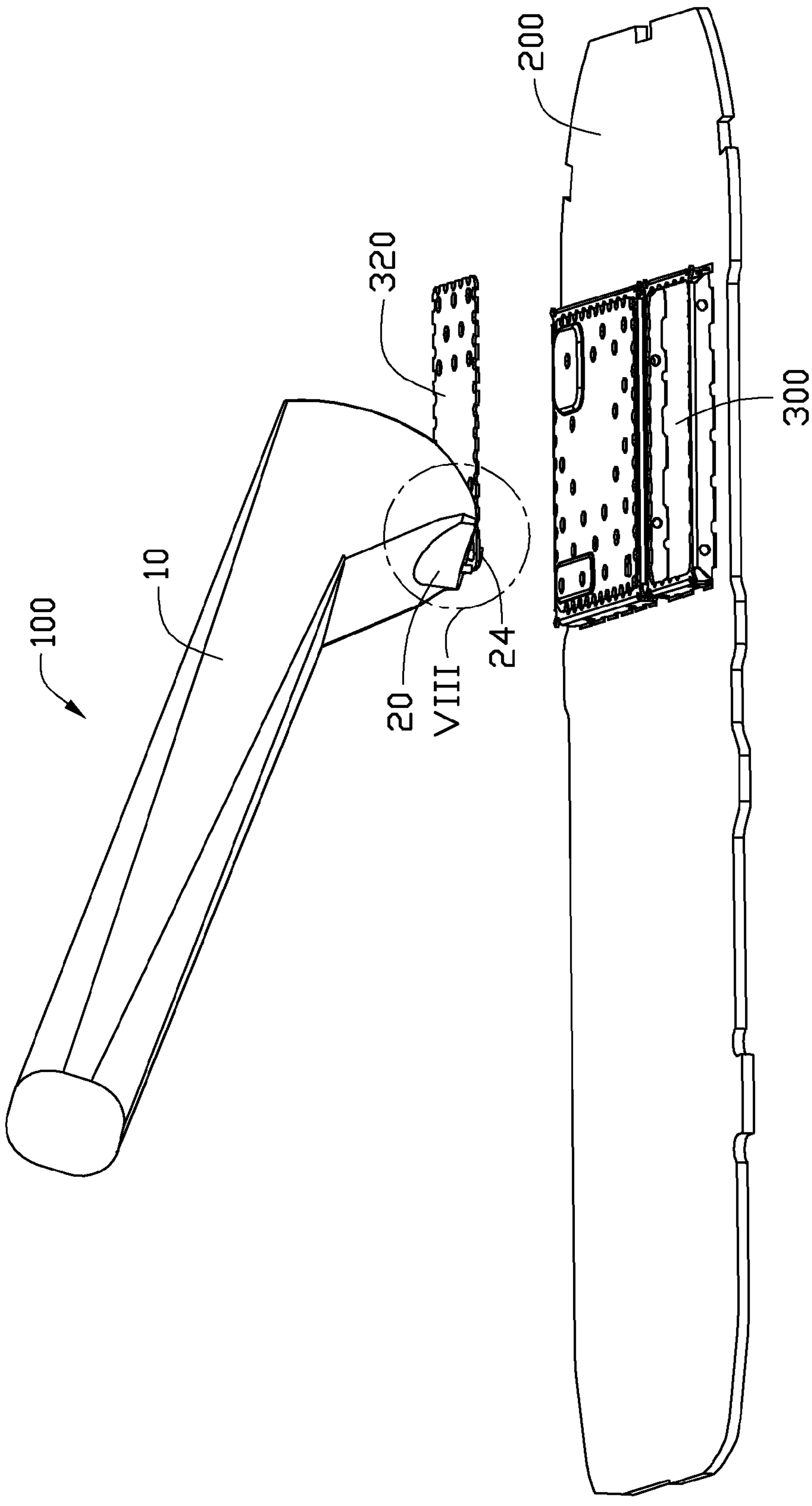
FIG. 7 is a schematic view of when the shielding cover is removed from the printed circuit board.
Figure 8:
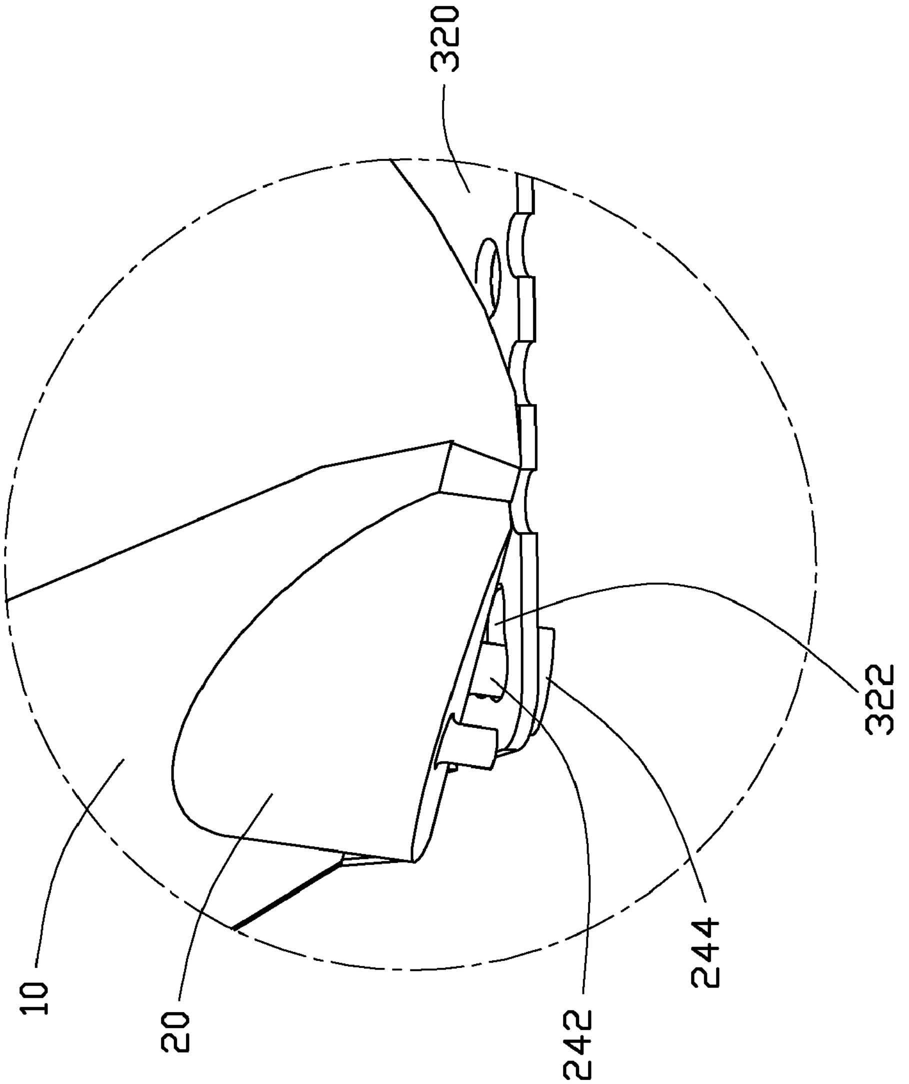
FIG. 8 is a partially enlarged view of a circled portion VIII of FIG. 7.

Referring to FIGS. 3-4, in use, the latching block 244 is inserted in the opening 322 and resists the portion of the removable element 320 surrounding the opening 322. The handle 10 is rotated in a first direction indicated by arrow A of FIG. 3 so the pushing portion 26 pushes the removable element 320 so the removable element 320 is bent relative to the shielding cover 300 until the removable element 320 separates from the shielding cover 300 along the cracking slot 324. Referring to FIGS. 5 and 6, then, the handle 10 is rotated in a second direction indicated by arrow B of FIG. 5 opposite to the first direction so the latching block 244 pulls the removable element 320 away from the shielding cover 300 like shown in FIGS. 7 and 8.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A removing tool used for removing a removable element from a shielding cover, the removing tool comprising:

a handle including a first end and a head protruding from the first end, the head defining a receptacle;

a removing member retained in the receptacle, the removing member including a driving portion and a pushing portion;

the driving portion mounted on the head; and the pushing portion mounted on the head between the driving portion and the first end;

wherein the driving portion is for latching with the removable element; the pushing portion pushing the removable element to bend the removable element relative to the shielding cover until the removable element separates from the shielding cover.

2. The removing tool claimed in claim 1, further including a retaining member; wherein the head defines a hole communicating with the receptacle; the retaining member is retained in the hole and resists the removing member to retain the removing member in the receptacle.

3. The removing tool claimed in claim 1, wherein the removing member includes a main body retained in the receptacle; the driving portion includes a connecting post protruding from the main body and a latching block protruding from a distal end of the connecting post, and the latching block is larger than the connecting post.

4. A removing tool used for removing a removable element from a shielding cover, the removable element defining an opening, the removing tool comprising:

a handle including a first end and a head protruding from the first end;

a driving portion latched on the head configured for being latching into the opening; and a cylindrical pushing portion mounted on the head between the driving portion and the first end;

wherein the driving portion is for latching with the removable element; when the handle rotates in a first direction relative to the shielding cover, the cylindrical pushing portion pushes the removable element to separate the removable element from the shielding cover.

5. The removing tool as claimed in claim 4, wherein when the handle rotates relative to the shielding cover in a second direction opposite to the first direction, the driving portion drives the removable member away from the shielding cover.

6. The removing tool claimed in claim 5, further including a removing member; wherein the head defines a receptacle in which the removing member is retained; the driving portion and the pushing portion both protruding from the removing member.

7. The removing tool claimed in claim 6, further including a retaining member; wherein the head defines a hole communicating with the receptacle; the retaining member is retained in the hole and resists the removing member to retain the removing member in the receptacle.

8. The removing tool claimed in claim 6, wherein the removing member includes a main body retained in the receptacle; the driving portion includes a connecting post protruding from the main body and a latching block protruding from a distal end of the connecting post, and the latching block is larger than the connecting post.

* * * * *